(12) United States Patent
Barron et al.

(10) Patent No.: US 8,333,328 B2
(45) Date of Patent: Dec. 18, 2012

(54) OPTICAL CODE RECOGNITION APPARATUS

(75) Inventors: Peter B. Barron, Tucker, GA (US); Don Collins, Buford, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/963,084

(22) Filed: Dec. 8, 2010

(65) Prior Publication Data

US 2012/0145792 A1    Jun. 14, 2012

(51) Int. Cl.
*G06K 7/08* (2006.01)
*G06K 7/10* (2006.01)
*G06K 15/00* (2006.01)
*G03B 7/08* (2006.01)
*G02B 26/10* (2006.01)

(52) U.S. Cl. ... 235/470; 235/454; 235/378; 235/462.25; 235/462.43; 235/462.24

(58) Field of Classification Search .............. 235/470, 235/378, 462.24–462.25, 462.43
See application file for complete search history.

(56) References Cited

U.S. PATENT DOCUMENTS

| | | | | |
|---|---|---|---|---|
| 5,189,291 A | * | 2/1993 | Siemiatkowski | 235/462.45 |
| 5,796,091 A | * | 8/1998 | Schmidt et al. | 235/472.01 |
| 6,330,973 B1 | * | 12/2001 | Bridgelall et al. | 235/462.45 |
| 6,354,496 B1 | * | 3/2002 | Murphy et al. | 235/383 |
| 7,325,731 B2 | * | 2/2008 | Tashiro | 235/383 |
| 7,546,953 B1 | * | 6/2009 | Collins, Jr. | 235/462.43 |
| 7,866,546 B1 | * | 1/2011 | Vance | 235/379 |
| 2003/0155418 A1 | * | 8/2003 | Daugs et al. | 235/383 |
| 2005/0283402 A1 | * | 12/2005 | Mason | 705/16 |
| 2006/0032914 A1 | * | 2/2006 | Brewster et al. | 235/383 |
| 2006/0038009 A1 | * | 2/2006 | Russell et al. | 235/383 |
| 2006/0261161 A1 | * | 11/2006 | Murofushi et al. | 235/383 |
| 2007/0051801 A1 | * | 3/2007 | Garver | 235/383 |
| 2007/0205277 A1 | * | 9/2007 | Tashiro | 235/383 |
| 2009/0272801 A1 | * | 11/2009 | Connell et al. | 235/383 |
| 2010/0065631 A1 | * | 3/2010 | Orlewski | 235/383 |
| 2010/0102130 A1 | * | 4/2010 | Madej et al. | 235/462.42 |
| 2010/0108766 A1 | * | 5/2010 | Madej et al. | 235/462.41 |
| 2012/0007738 A1 | * | 1/2012 | Barkan et al. | 340/540 |

* cited by examiner

*Primary Examiner* — Daniel Walsh
(74) *Attorney, Agent, or Firm* — Paul W. Martin

(57) ABSTRACT

An optical code recognition station comprises a fixed optical code scanning station and an optical code imager, the optical code imager being operable in both a hand held and a fixed configuration. In the fixed configuration the optical code imager is mounted on the fixed optical code scanning station. Communication between the fixed optical code scanning station and the optical code image is wireless and the optical code imager operates without a wired connection to the fixed optical code scanning station when in the hand held configuration.

24 Claims, 6 Drawing Sheets

OPTICAL CODE RECOGNITION APPARATUS

FIELD OF THE INVENTION

This invention relates an optical code recognition apparatus. More particularly, but not exclusively, it relates to an optical code recognition apparatus comprising a fixed optical code scanner and an imaging scanner operable in both hand held and fixed configurations.

BACKGROUND TO THE INVENTION

Checkout terminals use stationary barcode scanners, which can be mono-optic, a single scanner typically mounted in the horizontal direction, or bi-optic, typically mutually orthogonal scanners mounted in the horizontal and vertical directions respectively. However, imaging scanners are useful for the reading of two-dimensional barcodes and where a smaller than standard barcode is applied to an item. Imaging scanners are also useful where product recognition of non-barcoded items, for example fruit and vegetables, is required and also where barcodes cannot be scanned, for example where the barcode applied to an item is damaged, an image of the barcode can be analysed. Also, image capture can be used for imaging cheques and for security to prevent theft.

There is a desire to improve the ergonomic efficiency of imaging scanners and also to reduce the footprint of the area of the scanning portion of the retail checkout.

The ergonomic efficiency of the imaging scanners leads to greater throughput of items through the retail checkout leading to shorter customer queuing times and greater customer satisfaction. Also, ergonomic design leads to reduced operator fatigue and fewer operator injuries, for example repetitive strain injuries.

A reduction in the footprint of the scanning portion of the retail checkout leads to a reduced footprint of the overall retail checkout which is clearly desirable for retailers where floorspace is at a premium.

Handheld barcode scanners suffer from the problem that they are configured only for handheld scanning and cannot be readily integrated with stationary barcode scanners to compliment their operation as the optical path required for handheld use is fundamentally different from that required to operate in conjunction with stationary barcode scanners. Furthermore, handheld barcode scanners are typically constrained by cabling reducing the freedom of movement of checkout staff who use them.

SUMMARY OF THE INVENTION

According to a first aspect of the present invention there is provided an optical code scanning station comprising:
a fixed optical code scanner;
a receiving portion; and
the receiving portion being arranged to receive a detachable imaging scanner.

The detachable imaging scanner may comprise:
a window;
an image capture device; and
a processor;
the window defining a field of view from within which light is incident upon the image capture device, the image capture device being arranged to capture an image of said field of view, and the processor being arranged to process data corresponding to the captured image.

The receiving portion may be arranged to retain the imaging scanner such that the image capture device of the imaging scanner is directed towards a scan volume of the fixed optical code scanner.

The imaging scanner may comprise a wireless transceiver. The wireless transceiver may utilise any one of the following data transmission techniques: Bluetooth, RF, WIFI, Infra-red.

The imaging scanner may comprise a rechargeable power source. The imaging scanner may comprise a charging connector arranged to receive power from a complimentary charging connector of the receiving portion and is further arranged to supply this power to the rechargeable power supply.

The imaging scanner may be arranged to communicate with the scanning station wirelessly when detached therefrom. The imaging scanner may be arranged to operate wirelessly or wired of the scanning station when attached thereto.

The fixed optical code scanner may comprise:
a housing;
a light source;
a processor;
scanning optics arranged to produce a scan pattern from light emitted by the light source; and
a scan window in the housing arranged to define a scan volume of the scanner into which the scan pattern is projected.

The fixed optical code scanner may comprise a laser scanner.

The scan window may be aligned horizontally. The receiving portion may be formed in an edge of the housing. The receiving portion may be recessed into the edge such that only a portion of the imaging scanner projects beyond the level of the scan window, when received therein. The longitudinal axis of the imaging scanner, when received in the receiving portion, may be parallel to the direction of travel of an object passing over the scan window. The longitudinal axis of the imaging scanner, when received in the receiving portion, may be parallel to the direction of travel of a belt drive associated with the fixed optical code scanner.

The scan window of the fixed optical code scanner may be aligned vertically. The receiving portion may be formed in an upper surface of the housing. The receiving portion may be arranged to receive the imaging scanner such that the image capture device is remote from the housing. The longitudinal axis of the imaging scanner, when received in the receiving portion, may be perpendicular to the direction of travel of an object passing over the scan window. The longitudinal axis of the imaging scanner, when received in the receiving portion, may be perpendicular to the direction of travel of a belt drive associated with the fixed optical code scanner.

The scanning station may comprise two mutually orthogonally oriented fixed optical code scanners. The receiving portion may be located in either of the fixed optical code scanners.

According to a second aspect of the present invention there is provided a detachable imaging scanner for use with a retail checkout terminal comprising:
a window;
an image capture device; and
a processor;
the window defining a field of view from within which light is incident upon the image capture device, the image capture device being arranged to capture an image of said field of view, and the processor being arranged to process data corresponding to the captured image.

The imaging scanner may be arranged to be received in a receiving portion of a fixed scanning station. The receiving portion may be arranged to retain the imaging scanner such that the window of the imaging scanner is directed towards a scan volume of a fixed optical code scanner of the scanning station.

The imaging scanner may comprise a wireless transceiver. The wireless transceiver may be arranged to communicate with a complimentary wireless transceiver of a fixed scanning station. The wireless transceiver may utilise any one of the following data transmission techniques: Bluetooth, RF, WIFI, or Infra-red.

The imaging scanner may comprise a rechargeable power source. The imaging scanner may comprise a charging connector arranged to receive power from a complimentary charging connector of a receiving portion of a scanning station.

The imaging scanner may be arranged to communicate with the scanning station wirelessly wired when detached therefrom. The imaging scanner may be arranged to be operated wirelessly or wired when attached to a scanning station.

According to a third of the present invention there is provided an optical code recognition apparatus comprising:
a scanning station according to the first aspect of the present invention; and
an imaging scanner according to the second aspect of the present invention.

According to a third aspect of the present invention there is provided a method of operating a retail checkout terminal comprising receiving a detachable imaging scanner in a receiving portion adjacent a fixed optical code scanner of the retail checkout terminal.

The method may comprise defining a field of view of an image capture device of the imaging scanner via a window of the imaging scanner. The method may comprise directing the window of the imaging scanner towards a scan volume of the fixed optical code scanner.

The method may comprise communicating between the imaging scanner and the retail checkout terminal wirelessly, at least some of the time. The method may comprise utilising any of the following data transmission techniques: Bluetooth, RF, WIFI or Infra-red. The method may comprise operating the imaging scanner wirelessly when detached from the retail checkout terminal.

The method may comprise charging a rechargeable power supply of the imaging scanner from a charging connector of the receiving portion.

The method may comprise:
producing a scan pattern from light emitted by a light source of the fixed optical code scanner; and
defining a scan volume of the scanner into which the scan pattern is projected via a scan window.

The method may comprise receiving imaging scanner in the receiving portion such that only a portion of the imaging scanner projects beyond the level of the scan window, when received in the receiving portion. The method may comprise aligning a longitudinal axis of the imaging scanner parallel to the direction of travel of an object passing over the scan window, when received in the receiving portion. The method may comprise aligning a longitudinal axis of the imaging scanner parallel to the direction of travel of a belt drive associated with the fixed barcode scanner, when received in the receiving portion.

The method may comprise receiving the imaging scanner in the receiving portion such that the image capture device is remote from the housing. The method may comprise aligning a longitudinal axis of the imaging scanner perpendicular to the direction of travel of an object passing over the scan window, when received in the receiving portion. The method may comprise aligning a longitudinal axis of the imaging scanner perpendicular to the direction of travel of a belt drive associated with the fixed optical code scanner, when received in the receiving portion.

The retail checkout terminal may comprise two mutually orthogonally oriented fixed optical code scanners. The method may comprise associating the imaging scanner with one of the fixed optical code scanners.

According to a fourth aspect of the present invention there is provided a computer implemented method for use by a scanning terminal to identify an optical code presented to the terminal, the method comprising:
capturing image data by an imaging scanner detachable from the scanning terminal;
receiving the image data from the imaging scanner at a processor;
receiving scan data from a fixed scanner fixed to the scanning terminal;
processing the received image data and scan data to identify the optical code.

The method may comprise capturing the image data when the imaging scanner is detached from the scanning terminal. The method may comprise capturing the image data when the imaging scanner is attached to the scanning terminal.

The processor may be located within the imaging scanner.

The fixed scanner may comprise a laser scanner.

Receiving the image data may comprise using wireless communications. The method may comprise directing an image of the optical code to the imaging scanner by an optical device in the scanning terminal. The method may comprise defining a field of view for the scanning terminal and using an optical device in the scanning terminal directing an image from the field of view to the imaging scanner when the imaging scanner is attached.

The method may comprise receiving the scan data at the fixed scanner from the field of view through a first optical window in the scanning terminal and the imaging scanner receives image data directed from the first optical window. The method may comprise receiving scan data at the fixed scanner through a second optical window in the scanning terminal.

The method may comprise defining a field of view for the imaging scanner, where the imaging scanner is detached, that does not coincide with the field of view for the scanning terminal.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
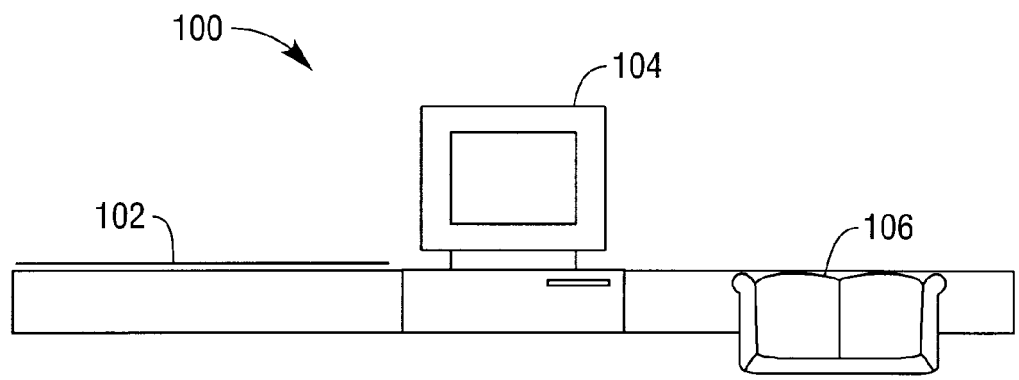
FIG. 1 is a perspective view of a retail checkout terminal comprising an optical code recognition apparatus according to an aspect of the present invention.

Referring now to FIG. 1, a retail checkout terminal 100 comprises a belt 102, a scanning station 104 and a bagging area 106.

The belt 102 drives customer's purchases towards the scanning station 104 so that optical codes on the purchased items can be scanned to form a transaction list and an associated bill. Once the purchased items have been scanned the customer places they are moved into the bagging area 106 for placement into bags for removal.

Figure 3:
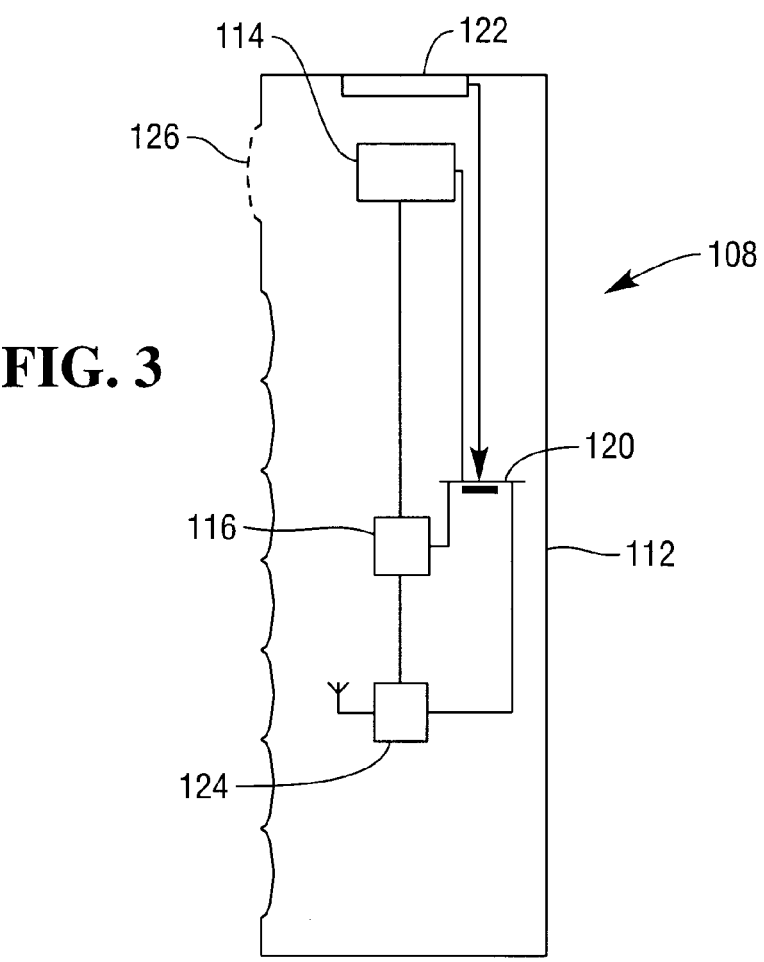
FIG. 3 is a schematic diagram showing components and a housing of the imaging scanner of FIGS. 2a and 2b.
Figure 2A:
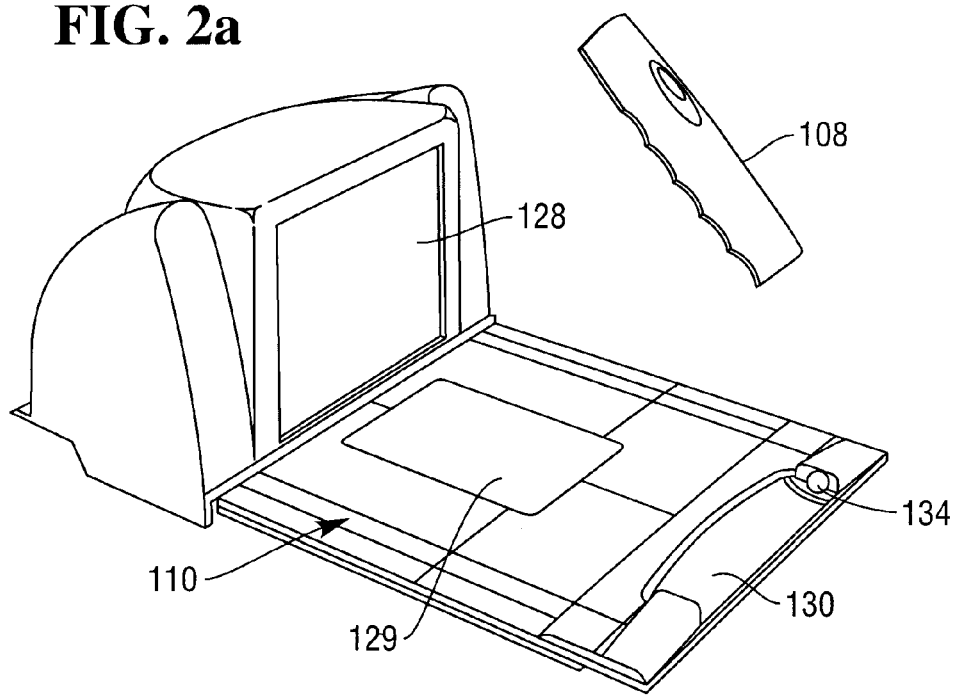
FIG. 2a is a perspective view of a first embodiment of a scanning station according to a further aspect of the present invention and an embodiment of an imaging scanner according to another aspect of the present the present invention, with the imaging scanner detached from the scanning station.
Figure 2B:
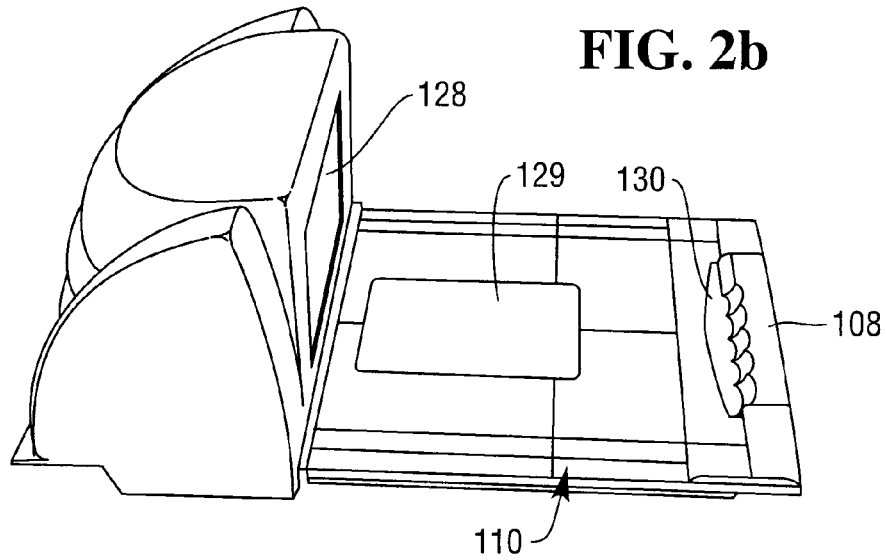
FIG. 2b is a perspective view of the a scanning station and the imaging scanner of FIG. 2a, with the imaging scanner retained by the scanning station.
Figure 2C:
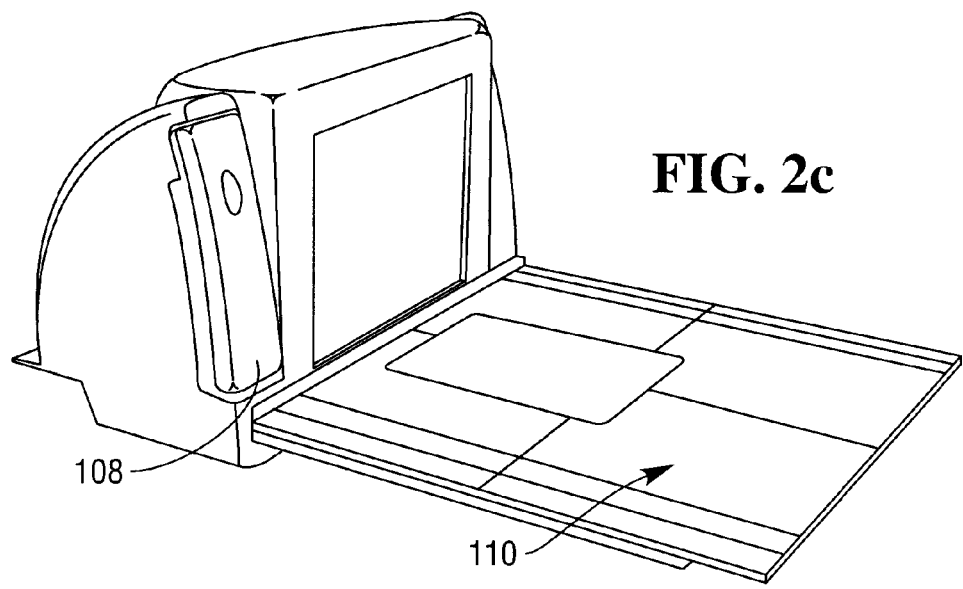
FIG. 2c is a perspective view of another embodiment of a scanning station according to a further aspect of the present invention and an embodiment of an imaging scanner according to another aspect of the present the present invention, with the imaging scanner attached to the scanning station.

Referring now to FIGS. 2a, 2b and 3, in a first embodiment, the scanning station 104 comprises a detachable image scanner 108 and a fixed barcode scanner 110. The detachable image scanner 108 is operable in either a hand held configuration, hereinafter referred to as a first configuration, and a fixed configuration where the image scanner 108 is received in the scanning station 104, hereinafter referred to as a second configuration.

The imaging scanner 108 comprises an elongate housing 112, an image capture device 114, typically a CMOS imaging array, a processor 116, a rechargeable power supply 120, typically a battery, a charging connector 122 and a wireless transceiver 124, typically utilising WIFI, RF, Infra-red or Bluetooth.

The housing 112 comprises an imaging window 126 passing through it such that the window 126 defines a field of view of the image capture device 114.

The scanning fixed barcode scanner 110 comprises a bi-optic barcode scanner, the construction and operation of a bi-optic barcode scanner is described in U.S. Pat. No. 5,229,588 the contents of which are incorporated herein by reference. The bi-optic scanner 110 of the present embodiment comprises a vertical window 128 and a horizontal window 129, each of which define a scan volume of the bi-optic scanner 110, within which an barcode on an object can be scanned. Typically, the horizontal window 129 and its surround 129a comprise a weighing scale for weighing, for example, fresh produce and other items sold on a "by weight" basis.

The barcode scanner 110 comprises a receiving cradle 130 adjacent the horizontal window 129 into which the imaging scanner 108 sits. The receiving cradle 130 comprises a scalloped recess 132 in an edge of the barcode scanner 110 opposite the vertical window 128. The cradle 130 retains the imaging scanner 108 in the second configuration such that the imaging scanner 108 lies parallel to the direction of travel of items through the scanning station 104. In the present embodiment, the cradle 130 retains the imaging scanner 108 such that a portion of the housing 112 lies below the level of the horizontal window 129 whilst the imaging window 126 has a field of view which includes at least part of the scan volume of the bi-optic scanner 110.

The receiving cradle 130 comprises a charging connector 134 which is complimentary to the charging connector 122 of the imaging scanner 108. The rechargeable power supply 120 of the imaging scanner 108 draws power from a power supply of the scanning station 104 to recharges the power supply 120 when the imaging scanner 108 is retained in the receiving cradle 130.

When used in the first configuration, the imaging scanner 108 is removed from the cradle 130, held in the user's hand and images of barcodes, or other optical codes, or of produce, in the case of produce recognition, or images of driver's licenses or checks in the field are captured by the image capture device 114.

In both the first and second configurations, data corresponding to an image captured by the image capture device 114 is passed to the processor 116 and then on to the wireless transceiver 122. The wireless transceiver 122 transmits the data to a remote station, typically a wireless transceiver in the scanning station 104, where it is processed to extract information from the image data. The information extracted from the image data may comprise, but is not limited to, barcode information or two dimensional barcode information which identifies a product associated with the barcode. Alternatively or additionally, but not exclusively, the information extracted may be produce recognition data, for example identifying an item of fresh produce such as a banana or a melon by shape, colour, a company logo etc.

It will be appreciated that although described in relation to the cradle 130 being adjacent the horizontal window 129 it will be appreciated that the cradle 130 can be located adjacent the vertical window 128 such that the imaging window 126 lies in a substantially vertical plane and is directed towards the scan volume of the bi-optic scanner 110. In this instance the longitudinal axis of the imaging scanner 108 is perpendicular to the direction of travel of items through the fixed scanner 110.

Figure 4A:
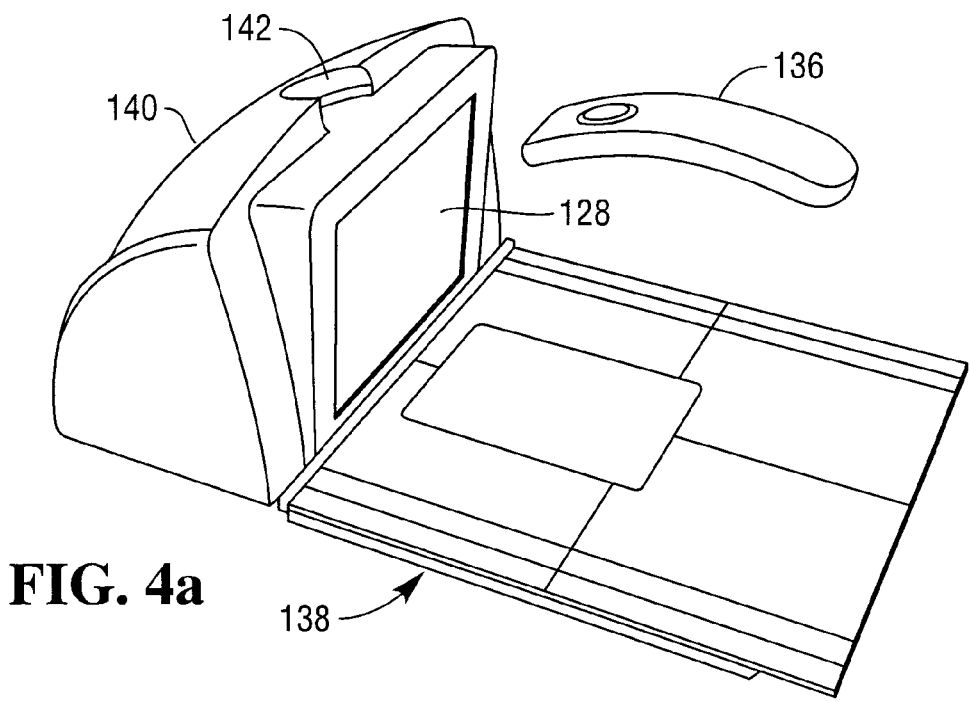
FIG. 4a is a perspective view of a second embodiment of a scanning station according to the further aspect of the present invention and the imaging scanner of FIG. 3, with the imaging scanner detached from the scanning station.
Figure 4B:
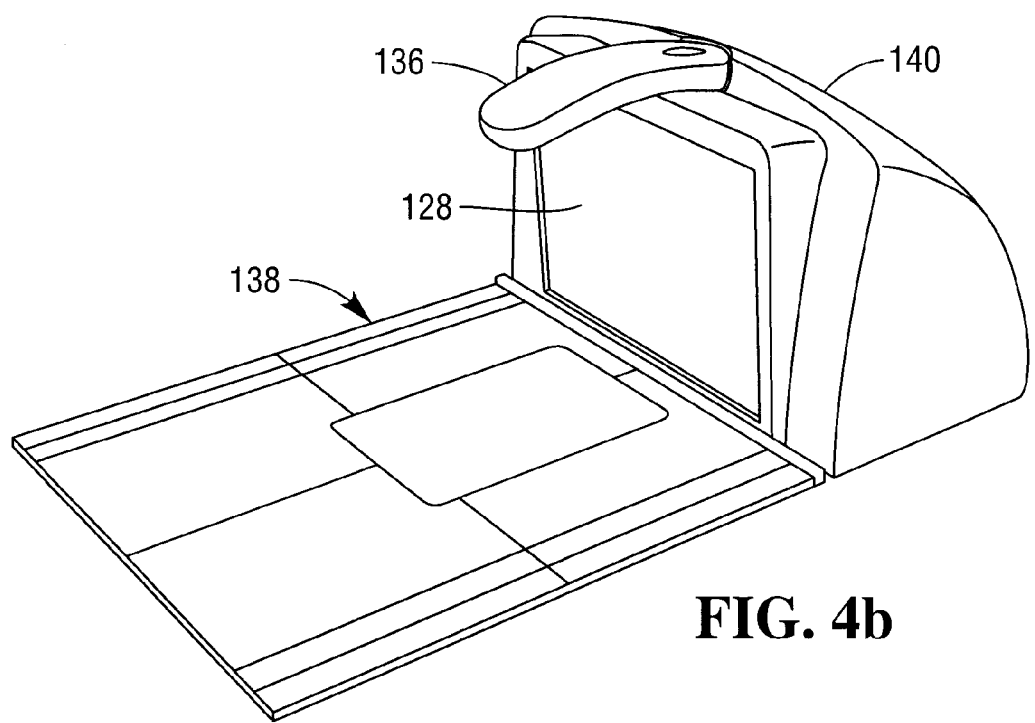
FIG. 4b is a perspective view of the scanning station of FIG. 4a and the imaging scanner of FIG. 3, with the imaging scanner retained by the scanning station.

Referring now to FIGS. 4a and 4b, with reference to FIG. 3, a second embodiment of the scanning station 104 comprises a detachable image scanner 136 and a fixed barcode scanner 138. The detachable image scanner 136 is substantially as described hereinbefore in relation to FIG. 3 and similar parts will be accorded the same reference numeral. The fixed barcode scanner 138 is a bi-optic barcode scanner substantially as described hereinbefore in relation to FIGS. 2a and 2b and similar parts will be accorded the same reference numeral.

A vertical optics housing 140 of the bi-optic barcode scanner 138 comprises the vertical window 128. The optics housing 140 comprises a recessed channel 142 in an upper edge thereof. The channel 142 is located at approximately the midpoint of the vertical window 128 and is dimensioned to retain the imaging scanner 136 such that the field of view of the image capture device 114 of the imaging scanner 136 encompasses at least part of the scan volume of the bi-optic scanner 138. Thus, the longitudinal axis of the imaging scanner is perpendicular to the direction of travel of items through the scanning station 104.

In the present embodiment the channel 142 frictionally engags with the housing of the imaging scanner 136 to retain it in position. Alternatively, or additionally, the channel 142 and housing of the imaging scanner 136 can comprise complementary elements of fixing arrangements, for example discrete recesses and projections, or tongue and groove, to retain the imaging scanner 136 in position.

The operation of the imaging scanner 136 and the bi-optic scanner 138 in the hand held, first configuration, is the same as that described in relation to FIGS. 2a, 2b and 3.

The transmission of image data between imaging scanner 136 and the scanning station 104 and its subsequent processing is the same as that described in relation to FIGS. 2a, 2b and 3.

The provision of a recharging connector in the channel 142 is similar to that described in relation to FIGS. 2a, 2b, and 3, such that charging of the imaging scanner 136 is effected when the imaging scanner 136 is located in the channel 142. Although it will be appreciated that the recharging connector of the imaging scanner 136 of the present embodiment will be located at an end of the housing remote from the imaging window.

Figure 5:
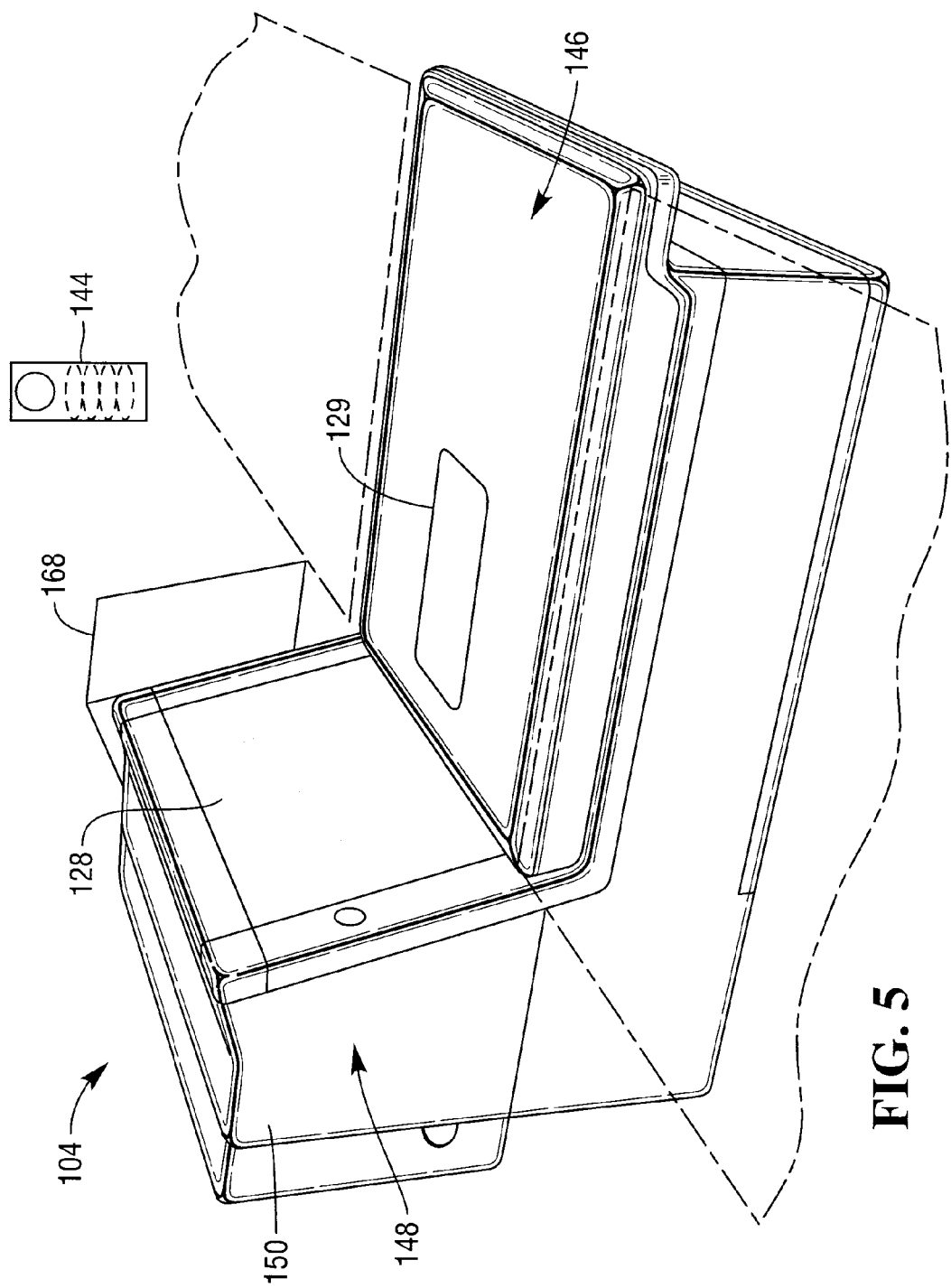
FIG. 5 is a perspective view of a third embodiment of a scanning station according to the further aspect of the present invention and the imaging scanner of FIG. 3, with the imaging scanner detached from the scanning station.
Figure 6:
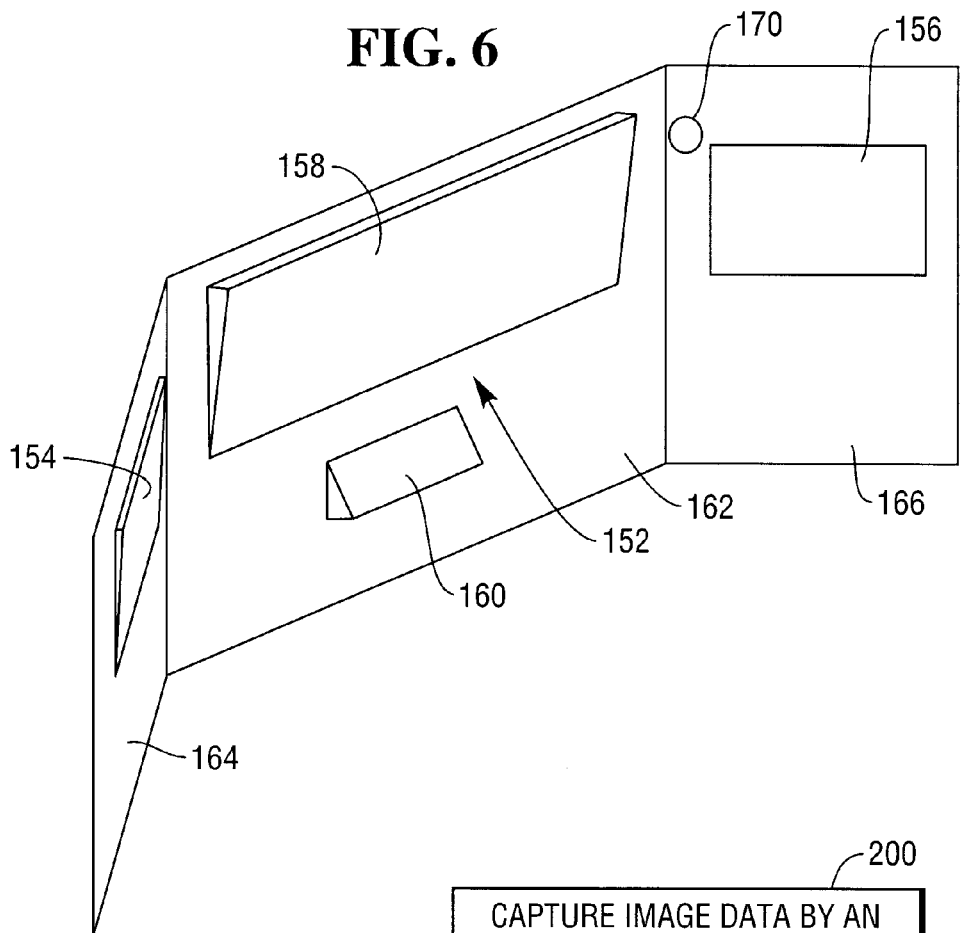
FIG. 6 is a perspective view of part of a housing and internal optics of a vertical optical tower of the scanning station of FIG. 5.

Referring now to FIGS. 5 and 6, in a third embodiment, the scanning station 104 comprises a detachable image scanner 144 and a fixed barcode scanner 146. The detachable image scanner 144 is substantially as described hereinbefore in relation to FIG. 3 and similar parts will be accorded the same reference numeral. The fixed barcode scanner 146 is a bi-optic barcode scanner substantially as described hereinbefore in relation to FIGS. 2a and 2b and similar parts will be accorded the same reference numeral.

A vertical optics tower 148 of the barcode scanner 146 comprises a housing 150, the vertical window 128 and optics 152 internal of the housing. The optics 152 comprise pattern mirrors 154, 156, 158 and imaging mirror 160.

The housing 150 comprises a rear wall 162 opposite the vertical window 128 and respective side walls 164, 166 which extend from the rear wall 162 to meet a face containing the vertical window 128 and an external receiving cradle 168 adjacent the window 128 which is arranged to receive the imaging scanner 144.

The side pattern mirrors 154, 156 are mounted on respective side walls 164, 166 of the housing 150. The rear pattern mirror 158 is mounted on the rear wall 162 of the housing 150. The pattern mirrors 154, 156, 158 act to direct light from a light source of the barcode scanner 146 through the vertical window 128 into the scan volume of the barcode scanner 146. The imaging mirror 160 is positioned below the rear pattern mirror 158, out of the path of light from the light source and is directed towards the scan volume of the barcode scanner 146.

A window 170 passes through the housing adjacent the cradle 168 such that there is a line of sight between the window 170 and the imaging mirror 160, typically, but not essentially, this line of sight passes between the side pattern mirror 156 and the rear pattern mirror 158. The cradle 168 receives the imaging scanner 144 such that the imaging window 128 of the imaging scanner 108 has a field of view which includes the window 128. The orientation of the imaging scanner 144 in the cradle 168 is such that the field of view of the imaging scanner 144 in the second configuration is aligned with the line of sight between the imaging mirror 160 and the window 170. Thus, the imaging scanner 108 has sight of the same scanning volume as the vertical window 128 of the barcode scanner 146.

It will be appreciated that the window 170 can be in either side wall 164, 166 of the housing 150 dependent upon which side of the housing 150 the cradle 168 present.

It will be further appreciated that the window 170 may be located at a point on the top surface of the housing 150 at the mid-point of the scan window 128 with commensurate variations to the scanner optics. In this instance the cradle 168 may correspond to the channel 142 of FIGS. 4a and 4b.

It will also be appreciated that although shown with reference to the vertical optics tower the window 170 may be provided in the basal, horizontal, fixed scanner portion to allow the imaging scanner to view through the horizontal scan window 129 with commensurate variations to the scanner optics. In this instance, the cradle 168 corresponds to the scalloped recess of FIGS. 2a and 2b.

The operation of the imaging scanner 144 and the bi-optic scanner 146 is the same as that described in relation to FIGS. 2a, 2b and 3.

The transmission of image data between imaging scanner 144 and the scanning station 104 and its subsequent processing is the same as that described in relation to FIGS. 2a, 2b and 3.

The provision of a recharging connector in the cradle 166 is similar to that described in relation to FIGS. 2a and 2b, such that charging of the imaging scanner 144 is effected when the imaging scanner 144 is located in the cradle 166.

It will be appreciated that lighting to illuminate the object for imaging can be located in; the imaging scanner 108, the vertical window 128, or the fixed barcode scanner 146.

Figure 7:
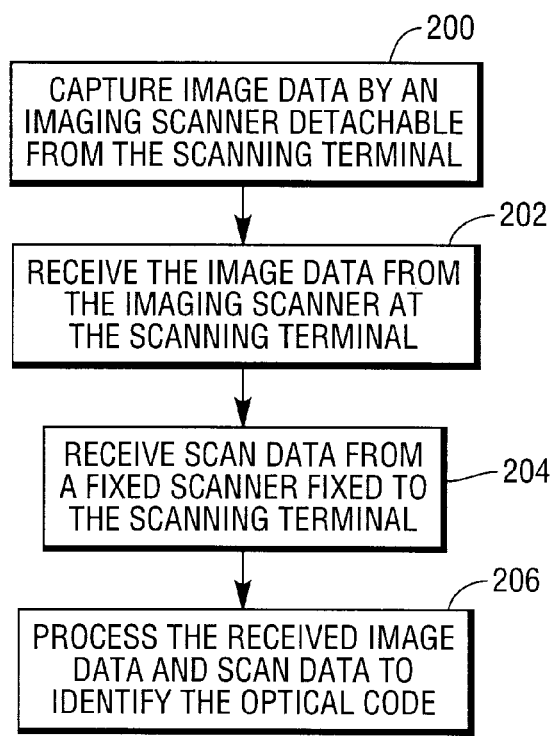
FIG. 7 is a flowchart detailing a computer implemented method for use by a scanning terminal to identify an optical code presented to the terminal according to a still further aspect of the present invention.

Referring now to FIG. 7, a computer implemented method for use by a scanning terminal to identify an optical code presented to the terminal comprises capturing image data by an imaging scanner detachable from the scanning terminal (Step 200). Image data is received from the imaging scanner at the scanning terminal (Step 202). Scan data from a fixed scanner fixed to the scanning terminal is received (Step 204). The received image data and scan data is processed to identify the optical code (Step 206).

It will be appreciated that the image data can be decoded at the imaging scanner and the decoded data passed to the scanning terminal.

It will be appreciated that although described with reference to a bi-optic barcode scanner the present invention is applicable to mono-optic, single window, barcode scanners.

It will also be appreciated that although described with reference to a retail checkout terminal the present invention is applicable to any terminal, assisted or self-service, where scanning and imaging of a optical codes are used, non-limiting examples of such terminals include: travel check-in terminals, medical check-in terminals, hospitality check-in/check-out terminals, for example in a hotel, a video, DVD, multi-media, mpeg3 etc sales/rental kiosk, a lottery kiosk, a postal services machine and automated teller machines (ATMs).

Various modifications may be made to the above described embodiments without departing from the spirit and the scope of the invention.

The invention claimed is:

1. An optical code scanning station for reading an optical code presented thereto, comprising:
   a fixed optical code scanner operable to receive scan data corresponding to a scan pattern projected into a scan volume of the fixed optical code scanner;
   a receiving portion in the fixed optical code scanner arranged to receive a detachable imaging optical code scanner operable to capture image data, said imaging optical code scanner comprising an image capture device;
   and wherein the fixed optical code scanner further comprises an optical device operable to direct an image from the scan volume to the imaging optical code scanner;

and wherein the optical code scanning station is operable to process both the image data and the scan data to read the optical code.

2. The scanning station of claim 1 wherein, the receiving portion is arranged to retain the imaging optical code scanner such that an image capture device of the imaging optical code scanner is directed towards a scan volume of the fixed optical code scanner.

3. The scanning station of claim 1 wherein, the imaging optical code scanner is arranged to operate wirelessly of the scanning station when detached therefrom.

4. The scanning station of claim 1 wherein, the fixed optical code scanner comprises:
a housing;
a light source;
scanning optics arranged to produce a scan pattern from light emitted by the light source; and
a scan window in the housing arranged to define a scan volume of the scanner into which the scan pattern is projected.

5. The scanning station of claim 4 wherein, the receiving portion is formed in an edge of the housing and is recessed into the edge such that only a portion of the imaging optical code scanner projects beyond the level of the scan window, when received therein.

6. The scanning station of claim 4 wherein, the receiving portion is formed in an upper surface of the housing and is arranged to receive the imaging optical code scanner such that the image capture device is remote from the housing.

7. The scanning station of claim 4, wherein a longitudinal axis of the imaging optical code scanner, when received in the receiving portion, is parallel to the direction of travel of an object passing over the scan window.

8. The scanning station of claim 4 wherein, a longitudinal axis of the imaging optical code scanner, when received in the receiving portion, is perpendicular to the direction of travel of an object passing over the scan window.

9. The scanning station of claim 1 wherein, the receiving portion is located in either of two mutually orthogonal surfaces of the fixed optical code scanner.

10. The scanning station of claim 1 wherein, the fixed optical code scanner comprises a laser scanner.

11. The scanning station of claim 1 comprising a wireless transceiver arranged to receive image data from the detachable imaging optical code scanner.

12. The scanning station of claim 11 comprising a processor arranged to process the image data and further arranged to process data from the fixed optical code scanner.

13. A detachable imaging optical code scanner for use with a retail checkout terminal operable to read an optical code presented thereto, comprising:
a window;
an image capture device;
and a processor;
the window defining a field of view from within which light is incident upon the image capture device, the image capture device being arranged to capture an image of said field of view, and the processor being arranged to process data corresponding to the captured image;
wherein the imaging optical code scanner is arranged to be received in a receiving portion of a fixed optical code scanner operable to obtain scan data corresponding to a scan pattern projected into a scan volume of the fixed optical code scanner, and wherein the fixed optical code scanner further comprises a field of view and an optical device arranged to capture image data and direct said image data to said imaging optical code scanner when the imaging optical code scanner is received therein, and wherein the retail checkout terminal is operable to read the optical code by processing both the scan data and image data.

14. The imaging optical code scanner of claim 13, comprising a wireless transceiver arranged to communicate with a complimentary wireless transceiver of the fixed optical code scanner.

15. The imaging optical code scanner of claim 13, wherein the imaging optical code scanner is arranged to be operated wirelessly when detached from the fixed optical code scanner.

16. An optical code scanning system for reading an optical code presented thereto, comprising:
a fixed optical code scanner operable to receive scan data corresponding to a scan pattern projected into a scan volume of the fixed optical code scanner;
a receiving portion in the fixed optical code scanner arranged to receive a detachable imaging optical code scanner operable to capture image data, said imaging optical code scanner comprising an image capture device, a window, and a processor, wherein said window defines a field of view from within which light is incident upon the image capture device, the image capture device being arranged to capture an image of said field of view, and the processor being arranged to process data corresponding to the captured image; and wherein the fixed optical code scanner further comprises an optical device operable to direct an image from the scan volume to the optical code imaging scanner;
and wherein the processor is operable to process both the image data and the scan data to read the optical code.

17. A computer implemented method for use by a terminal to read an optical code presented to the terminal, the method comprising:
capturing image data by an imaging optical code scanner detachable from a fixed optical code scanner fixed to the terminal, wherein capturing further comprises defining a field of view of the fixed optical code scanner and using an optical device in the fixed optical code scanner to direct an image from the field of view to the imaging optical code scanner when the imaging optical code scanner is attached;
receiving the image data from the imaging scanner at a processor;
receiving scan data from the fixed optical code scanner; and processing both the image data and the scan data to identify and read the optical code.

18. The method of claim 17 wherein the processor is located within the imaging optical code scanner.

19. The method of claim 17 wherein capturing comprises capturing the image data when the imaging optical code scanner is attached to the fixed optical code scanner.

20. The method of claim 17 wherein receiving the scan data comprises receiving the scan data at the fixed optical code scanner from the field of view through a first optical window in the fixed optical code scanner, wherein capturing comprises receiving the image data through the first optical window from an optical device in the fixed optical code scanner.

21. The method of claim 17, wherein the fixed optical code scanner is a laser scanner.

22. The method of claim 17, wherein receiving the image data includes using wireless communications.

23. An optical code scanning station operable to read an optical code presented thereto, comprising:
a fixed optical code scanner including
a housing;
a light source;

scanning optics arranged to produce a scan pattern from light emitted by the light source; and a scan window in the housing arranged to define a scan volume of the scanner into which the scan pattern is projected; and a receiving portion;

wherein the receiving portion is arranged to receive a detachable imaging optical code scanner; and wherein, the receiving portion is formed in an edge of the housing and is recessed into the edge such that only a portion of the imaging optical code scanner projects beyond the level of the scan window, when received therein wherein the fixed optical code scanner comprises an optical device arranged to direct an image from the scan volume to the imaging optical code scanner when the imaging optical code scanner is received therein, and wherein the station further comprises a processor operable to process both image data received from the imaging optical code scanner corresponding to the image and scan data received from the fixed optical code scanner corresponding to the scan volume to read and decode the optical code.

24. An optical code scanning station operable to read an optical code presented thereto, comprising:

a fixed optical code scanner including a housing;

a light source;

scanning optics arranged to produce a scan pattern from light emitted by the light source; and a scan window in the housing arranged to define a scan volume of the scanner into which the scan pattern is projected; and a receiving portion;

wherein the receiving portion is arranged to receive a detachable imaging scanner comprising an image capture device; and wherein the receiving portion is formed in an upper surface of the housing and is arranged to receive the imaging scanner such that the image capture device is remote from the housing wherein the fixed optical code scanner comprises an optical device arranged to direct an image from the scan volume to the imaging optical code scanner when the imaging optical code scanner is received therein, and wherein the station further comprises a processor operable to process both image data received from the imaging optical code scanner corresponding to the image and scan data received from the fixed optical code scanner corresponding to the scan volume to read and decode the optical code.

* * * * *